Feb. 17, 1948.   A. G. HERRESHOFF ET AL   2,436,043
ENGINE AND METHOD OF MAKING PARTS THEREOF
Filed March 24, 1944   4 Sheets-Sheet 1

INVENTORS
Alexander G. Herreshoff,
Addison H. Houk.
BY
Harness and Harris
ATTORNEYS

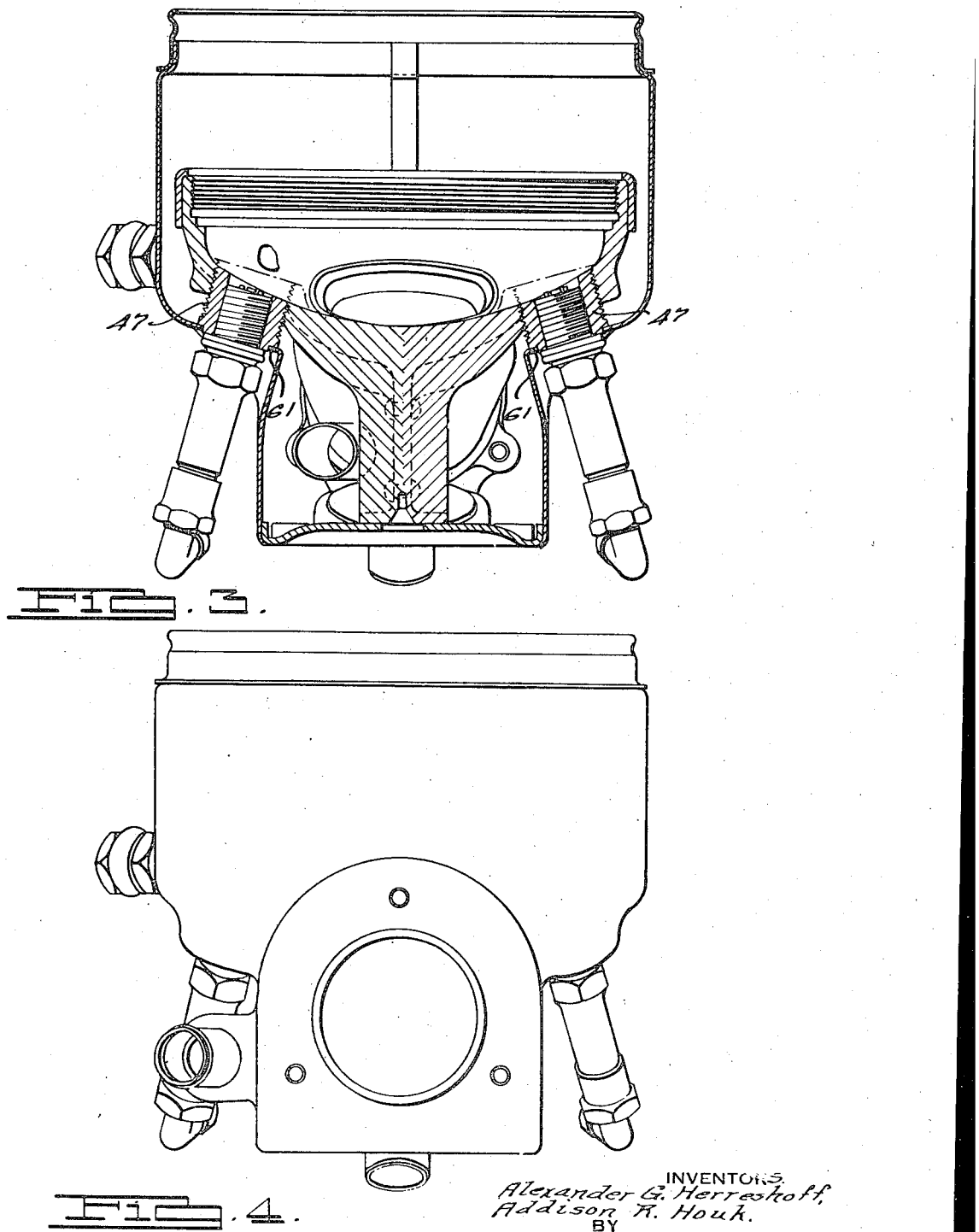

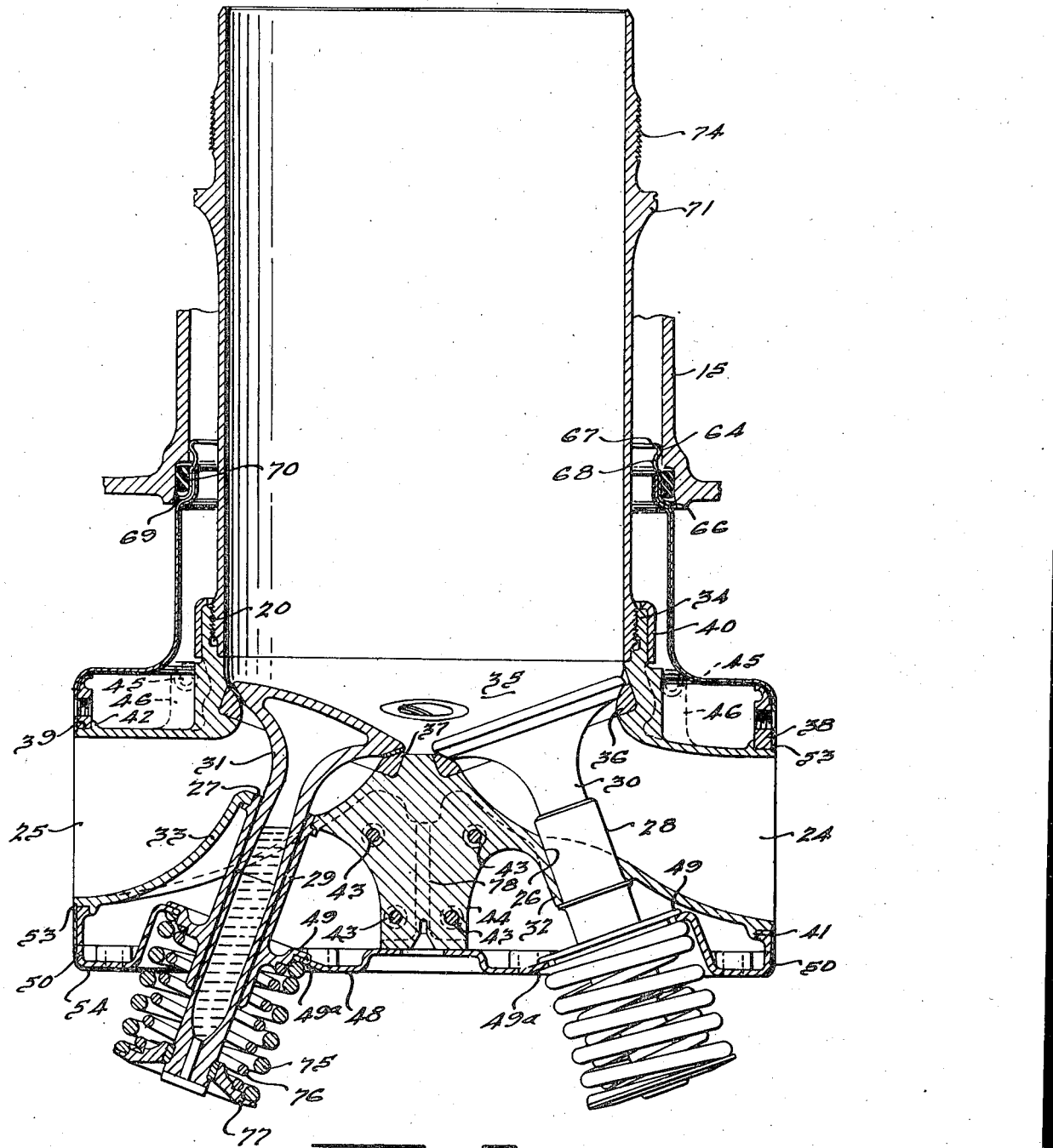

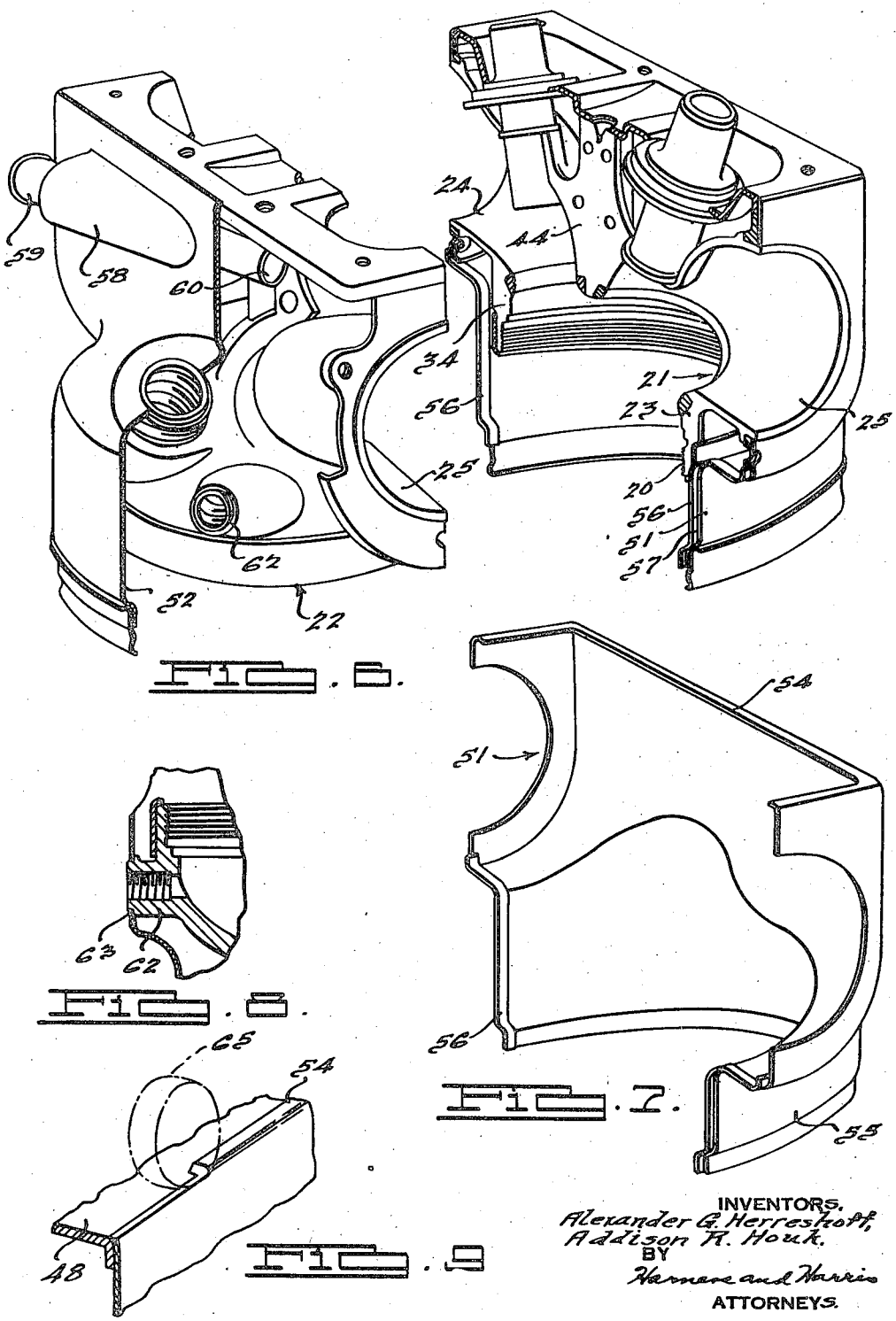

Patented Feb. 17, 1948

2,436,043

UNITED STATES PATENT OFFICE 2,436,043

ENGINE AND METHOD OF MAKING PARTS THEREOF

Alexander G. Herreshoff, Grosse Pointe, and Addison R. Houk, Detroit, Mich., assignors to Chrysler Corporation, Highland Park, Mich., a corporation of Delaware Application March 24, 1944, Serial No. 527,892

15 Claims. (Cl. 123—173)

1

This invention relates to engines and refers more particularly to improvements in engines of the types used in aircraft although in its broad aspects our improvements are useful to advantage in engines adapted for any other use.

In the construction of aircraft engines where weight is of great importance, it is customary to form the cylinder heads as castings of light weight alloys such as aluminum, magnesium, or Duralumin. Such castings are open to a number of objections. Because of strength requirements, the wall thickness of such castings must be greater than desired thereby resulting in excessive spacing of adjacent cylinders for a given cylinder bore. Further, such castings are subject to failure owing to difficulty in maintaining uniformity in the structure of the various castings including failures due to core shifting and porosity. In addition, such castings are objectionable in that the intake and exhaust passages cannot be finished to the desired streamline shape and degree of smoothness for maximum operating efficiency of the engine.

It is an object of our invention to overcome the aforesaid difficulties and objections by the provision of improved cylinder head construction and method of making same. In carrying out our invention we form the main body portion of the cylinder head of two steel forgings which are brazed or otherwise integrally bonded together. The plane of juncture between the two halves extends through the axes or center lines of the intake and exhaust passages and contains the axis of the cylinder. Where the engine is of the liquid cooled type we have provided a novel structure of sheet metal jacketing which is likewise brazed or attached in equivalent manner to the main cylinder head portions so as to provide a structural unit of the whole cylinder head.

By reason of our invention the cylinder head is formed of improved strength and uniformity while at the same time having the desired degree of lightness of weight. Furthermore, the plane of division in passing through the intake and exhaust ports or passages affords convenient access thereto, prior to brazing the halves together, for imparting the desired streamline shape and high degree of smoothness. Also, as the walls may be relatively thin, in comparison with cast aluminum, the cylinders may be disposed relatively closer together for a given cylinder bore dimension, resulting in a material saving in the weight, size and cost of the engine.

In the copending application of Alexander G. Herreshoff, Serial No. 447,532, filed June 18, 1942,

2 now Patent 2,402,889, June 25, 1946, there is disclosed and claimed an engine or cylinder head formed of complementary sections meeting and bonded to one another generally on a plane passing through the combustion chamber and the intake and exhause ports. The present application involves certain changes that improve not only the method of making an engine or cylinder head of that type but also the engine or cylinder head itself.

In the broad sense, the aforementioned copending application relates to a structure formed of complementary parts bonded to one another. The present application offers certain improvements that affect the method followed in bonding the parts of the structure and also the structure itself, since an improved joining of the parts is obtained.

An object of the present invention is to provide improvement in a structure, particularly an engine cylinder head, formed of complementary parts bonded to one another.

Another object is to improve a cylinder construction formed of parts bonded together, which construction includes a jacket for coolant and tubular valve guides. With the improvements of the present invention the jacket is formed in several parts separate from the cylinder head itself, and likewise the valve guides are formed separately. The formation of the jacket and the valve guides separate from the cylinder head itself permits an improved formation and bonding of all the parts involved.

A further object is to provide structural aids to the bonded construction of a cylinder head formed of complementary parts. More particularly the cylinder head of the present invention includes parts that hold together component members of the head while they are being bonded together. These parts form a permanent part of the cylinder head in its final form and contribute to the final form in that they continue their holding action even after the bonding operation.

Still another object is to provide an improved method for forming a cylinder from a plurality of parts bonded to one another and more particularly a method of manufacture involving the use of the parts employed for holding complementary members being bonded as mentioned in the preceding paragraph.

A further object is to improve a method of bonding parts of an engine cylinder head together. With the cylinder head of the present invention a plurality of parts are bonded together in more than one bonding operation. We have carried out the bonding operations so that the heat of one bonding operation does not deleteriously affect the bonds produced by a previous bonding operation.

It is frequently a problem during the bonding of several parts together to form a composite structure, particularly an engine cylinder head, to hold the parts with sufficient force for a good bond. According to the present invention in one of its aspects, the said several parts to be bonded are held together by other parts that form part of the final structure and of which some are bonded to parts of the final structure. This improvement is advantageously applied to the cylinder head construction disclosed in the aforementioned copending application.

Other objects will appear from the disclosure.

Fig. 3 is a sectional elevational view taken approximately as indicated by line 3—3 of Fig. 2.

Fig. 4 is a side elevational view of the cylinder head taken as indicated by line 4—4 of Fig. 1.

Fig. 5 is an enlarged sectional elevational view of the left cylinder and cylinder head assembly as seen in Fig. 1.

Fig. 6 is an inverted perspective view of the cylinder head assembly, the component parts of the main body and jacketing portions being shown separated at their brazed surfaces, a portion of the jacket being broken away.

Fig. 7 is a perspective view of one of the component jacketing portions as seen in Fig. 6.

Fig. 8 is a sectional view showing a detail.

Fig. 9 is a perspective view showing a step in the manufacture of the structure of the present invention.

Figure 1:
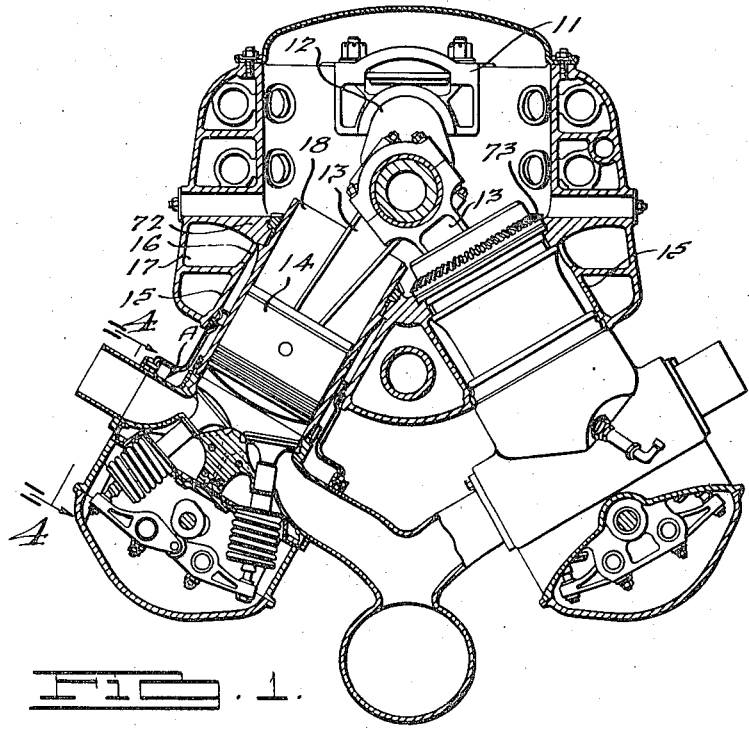
Fig. 1 is a transverse sectional elevational view through the illustrated engine.

Referring to the drawings, we have illustrated our invention in connection with an internal combustion engine of the inverted V-type in which the cylinders are positioned inverted with respect to more conventional practice. Fig. 1 is a typical transverse section through a pair of the V-arranged cylinders of each bank. Our invention is not limited to engines having any particular number, arrangement, or positioning of cylinders as it is more concerned with the construction of the cylinder heads and associated parts of the engine together with the method of making the same.

In Fig. 1 the engine comprises a casing structure in the form of a casting 10 carrying bearings such as at 11 for journalling the crankshaft 12 connected by rods 13 to the respective pistons 14. The casing 10 at each typical section corresponding to the Fig. 1 showing is formed with a pair of V-arranged cylinder-receiving tubular portions 15 each having a coolant outlet 16 for admitting coolant to a header 17 formed in the casing.

Inasmuch as any cylinder and its associated cylinder head of the engine is typical of the group, I have arbitrarily selected the left cylinder of Fig. 1 to illustrate the details of my invention and the following description will, for the most part, be directed to this typical structure in which the piston 14 operates in a cylinder 18 securely seated adjacent its inner end to the inner end of the tubular portion 15 and spaced therefrom to provide a liquid coolant jacket 19 from which coolant is circulated inwardly from the cylinder head to the outlet 16 and header 17. The outer end of the cylinder 18 mounts the cylinder head assembly A by a threaded connection 20 (Fig. 5).

The cylinder head A comprises a pair of generally similar steel forgings 21 and 22 each of which is formed with a plane boundary surface 23 extending transversely of the engine. Depressed or extending from each surface 23 is a concave hemi-intake port or passage 24 and a concave hemi-exhaust port or passage 25. Hemi-openings 26 and 27 are formed, respectively, at the hemi-ports 24 and 25 and receive, respectively, tubular guides 28 and 29 for intake valve 30 and exhaust valve 31. At each hemi-opening 26 a boss 32 extends outwardly of the hemi-port 24. At each hemi-opening 31 the hemi-port 25 is depressed inwardly as indicated at 33. The forgings 21 and 22 each have a hemi-cylindrical cylinder-carrying portion 34 depending inwardly of the engine from the hemi-ports 24 and 25, and having a hemispherical combustion chamber portion 35 open to the inner ends of the hemi-ports where the ports are shouldered to receive the valve seat inserts 36 and 37.

The forgings 21 and 22 form the main body portions of the cylinder head A and are copper brazed or otherwise integrally bonded together at their mating surfaces 23 such that the corresponding concave or depressed portions aforesaid align with each other as will be readily understood to form the complete intake and exhaust ports, valve stem guide-receiving cylindrical openings, cylinder-carrying portion, and combustion chamber. The forgings 21 and 22 are held together not only by brazing of the forgings but also by means of rings 38, 39, and 40, shrunk upon the assembled forgings. Ring 38 embraces the forgings 21 and 22 at the hemi-intake ports 24 abutting a flange 41. Ring 39 embraces the forgings at the hemi-exhaust ports 25 abutting a flange 42. Ring 40 embraces the hemi-cylindrical cylinder-carrying portions 34. Before the rings are applied to the forgings, rivets 43 are applied through portions 44 between the hemi-ports 24 and 25 to hold the forgings in assembled relation properly, so that various finishing operations may be formed. For example, after riveting the portions of the forging on which the rings 38, 39, and 40 are shrunk are finished so that the rings will seat properly. Rivets 45 are also applied to the portions 46 of the forgings, the rivets and portions being indicated on dash-dot lines in Fig. 5, for they are removed at some time prior to application of the jacket members to the forgings. After the rings are applied to the forgings, a hydrogen-brazing operation is performed to bond the forgings to one another and the rings to the forgings. The parts may have been coated with copper before assembly or may have copper or other brazing material applied after assembly. In the same brazing operation spark-plug inserts 47 may be bonded to the forgings.

Thereafter the guides 28 and 29 are applied in the openings 26 and 27 of the forgings 21 and 22 and a shelf member 48 formed of sheet metal is applied to the forgings 21 and 22, the guides 28 and 29, and the rings 38 and 39. The shelf 48 contacts the portions 44 of the forgings, and flanges 49 of the tubular guides 28 and 29 contact depressed portions 49ª formed in the shelf. The shelf has a peripheral flange 50 contacting the rings 38 and 39. The shelf 48 may be bonded to the rings 38 and 39, the forgings 21 and 22, and the tubular guides 28 and 29 to the forgings 21 and 22 in a single hydrogen-brazing operation by means of a brazing material such as copper.

At this time the portions 46 and the rivets 45 may be cut away.

Surrounding the forgings 21 and 22 are the enclosing coolant jacketing members 51 and 52 respectively. These jacketing members are steel stampings, each having a hemi-opening surrounding the outer end of the associated hemi-port 25 and a like opening surrounding the hemi-port 24. At these regions the rings 38 and 39 are set back of the outer ends of the ports, and shoulders 53 are formed around the outer ends of the ports beyond the rings 38 and 39 for receiving the jacketing members 51 and 52 flush with the ends of the ports.

At its outer end, each of the jacketing members 51 and 52 is formed with an in-turned flange 54 (Fig. 7) adapted to engage the bottom of the shelf 48, as seen at the left side of Fig. 5.

Each jacketing member 51 or 52 has a hemi-cylindrical portion 55 spaced from the associated hemi-cylindrical portion 34 of a forging 21 or 22 and concentric therewith so that the coolant may circulate around the combustion chamber and ports and pass inwardly of the engine to the jacket 19. A bridge strip 56 is tack-welded to the inner surface of one of the jacketing members, such as jacketing member 51 (Fig. 6), adjacent each marginal face 57 in the plane of face 23. Each strip 56 extends from the inner end of the jacket portion 55 to the ring 38 or 39 (Figs. 5 and 6) adjacent the outer ends of the port, the rings being recessed to seat these strips.

When the jacketing members 51 and 52 are brought together, their corresponding faces 57 abut each other in the same plane with the engaging faces 23, and the portions of the bridge pieces 56, which are shown projecting from these faces, then engage the inner faces of the jacketing member 52 so as to strengthen the union between the jackets and facilitate soldering of the jacketing members together. The bridge pieces are soldered to the jacketing members 51 and 52 at the same time that the jacketing members are soldered together at faces 57.

Jacketing member 52 is formed with a struck-out pocket portion 58 (Figs. 2 and 6) for receiving a coolant tube 59 which is disposed so that its outlet 60 is directed toward the guide 29 for the exhaust valve stem for cooling the same at this critical region. The tube 59 is soldered in position. Each spark-plug insert 47 has a shoulder 61 for seating the marginal portion of an opening 62 provided in the associated jacketing member 51 or 52, the inserts being soldered to the jacketing members to form a liquid-tight joint. A protrusion 63 (Figs. 3 and 6) is integral with the wall of forging 22 at the combustion chamber and is similarly joined with the jacketing member 52 at a shoulder 63. This protrusion 62 is adapted to mount a further engine accessory such as a liquid fuel injecting nozzle (not shown) of any well known type when the engine is of the fuel injection type.

In order to insure that the spark-plug inserts 47 shall conform with the desired smooth surface of the combustion chamber and also that the shoulders 61 and 63 shall fit with the jackets, we arrange these inserts for installation as follows. Before the combustion chamber is machined the forgings are provided with shoulders or bosses at the locations of the inserts. For example, in Fig. 3 we have illustrated one of these bosses 64 for an insert 47. The insert is threaded into the forging and boss 60 and is brazed in position. Then the internal threads are cut in the insert, the shoulder 61 formed for fit with the jacket, and the combustion chamber machined to desired finish while at the same time the boss 64 is cut away leaving the insert flush with the combustion chamber contour. This practice is followed for each of the inserts which are brazed and machined at the same time.

The jacket members 51 and 52 are soldered to one another by the strips 56, to the ends of the ports 24 and 25 and the rings 38 and 39 at the shoulders 53, and to the under side of the shelf member 48 at the flanges 54. Also the jacket members are soldered to the shoulders 61 and 63 of the inserts 47 and the protrusion 62. A sealing and reinforcing ring 64 is also soldered to the jacket members. All this may be done in a single operation if desired. The term "soldering" has been employed to describe the bonding of these parts as against the term "brazing" for the joining of certain other parts such as the joining of the forgings 21 and 22 to one another, the rings 38, 39, and 40 to the forgings, and the shelf member 48 to the forgings and the rings in order that "soldering" may refer to bonding at some relatively low temperature such as with silver at about 1175° F. as against "brazing" at some relatively high temperature such as with copper at about 2050° F. This is done in order that the bonding of the jacket members to the forgings, etc., will not disturb the previously formed bonds of the forgings and the rings. Therefore, there will be no possibility that the previously copper brazed parts be disturbed or warped during the silver brazing of the jacket into position, especially as inspection of all of the copper brazed parts would be difficult after brazing the jacket in the assembly. In addition, silver brazing is preferred for the jacket-forming structure as this is somewhat more effective than copper brazing where the parts are not held to closely fitting limits. It is neither necessary nor convenient to hold the stamped parts to such fit and therefore the well known commercial silver brazing process is well adapted for such stamped parts. However, welding or copper brazing may be employed, instead of silver brazing, if desired.

After the soldering of the jacket members, a machining element 65 is employed to remove the flanges 54 from the jacket members, as shown in Fig. 9.

While the foregoing steps in my methods are outlined as to some of the details which are involved, it should be understood that the relative order of conducting many of these steps may be varied as desired and my method invention, in its broader aspects is not limited to such outlined steps which have been set forth by way of illustration. Furthermore, while I prefer to integrally bond together the component parts of my cylinder head construction by brazing, other methods of integrally bonding may be employed, such as welding.

The plane 23 of bonding between the forgings 21 and 22 contains the axis of cylinder 18 and also the center of the spherical combustion chamber 35.

At the inner end of the assembly, the terminal cylinder-forming portions of the jacketing members 51 and 52 are inwardly offset as shoulder 65 (Fig. 3) from portions adjacent thereto surrounding the threaded connection 20. This offset end portion is fitted with the external reinforcing ring 64 which has its opposite ends flanged at 66 and 67 in relatively opposite directions and is provided with an intermediate strengthening rib 68. The inner end portion 67 pilots the ring into the tubular portion 15 and the intermediate portion of the ring cooperates with a counterbore 69 of tubular portion 15 to squeeze a deformable sealing ring 70 therebetween serving to form a fluid-tight joint.

The cylinder 18 is securely seated in the casing 10 to resist outward thrust of the cylinder caused by the explosion pressure developed in the combustion chamber 35. This pressure tends to force the cylinder head outwardly and this force is transmitted to cylinder 18 through the threaded connection 20.

Each cylinder has an annular shoulder 71 intermediate its length for seating on an annular shoulder 72 which bounds an opening in casing 10 through which opening the cylinder projects to threadedly receive a clamp ring 73 at the threads 74 (Figs. 1 and 6). This clamp ring seats on the inner face of shoulder 72 and serves to hold the cylinder firmly secured to the casing 10.

Figure 2:
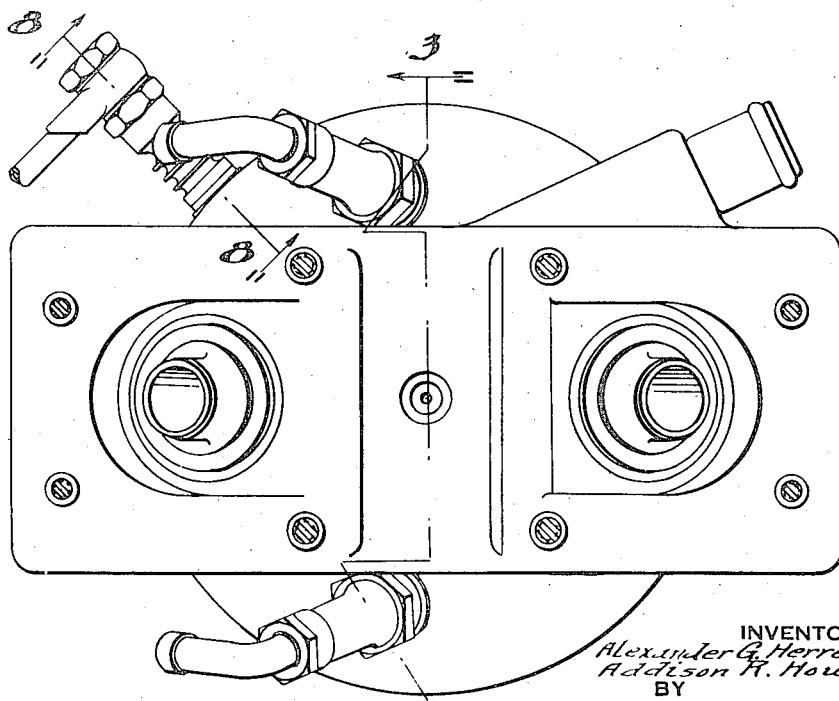
Fig. 2 is a bottom plan view of the cylinder head assembly which is shown at the left side of Fig. 1.

In Figs. 2 and 6 it will be apparent that the incoming coolant, which is supplied in any convenient manner to the tube 59 of each cylinder head, is discharged at 60 from each tube. This tube is so directed in relation to the exhaust valve stem housing 29 that the incoming coolant impinges directly against this housing coming from a direction transversely to the axis of the housing. Therefore this critical region, from a standpoint of heat developed at the cylinder head, is maintained sufficiently cool to improve the operating efficiency of the combustion process and the engine in general. In aircraft engines the valve 31 and its stem is ordinari'y hollow as shown in Fig. 5 to receive sodium or other medium to assist cooling of the valve as is well known in the art. Our invention is especially useful in connection with valves of this type and serves to carry away much of the heat by efficient cooling of the housing 29. In addition, our arrangement insures against sticking of the valve 31 from causes incident to lack of proper cooling of the valve and its stem.

Each of valves 30 and 31 is supplied with springs 75 and 76 acting between depressed portion 49 of the plate member 48 and a spring retainer 77 at the stem end of the valve.

Space for coolant is provided between the jacket members 50 and 51 and the forgings 21 and 22. Portions 46 and rivets 45 are removed before application of the jacket members to the forgings in order that the coolant space will not be restricted at the region of the portions 46.

Reference has been made to the portions 44 of the forgings 21 and 22 and the rivets 43 passing through these portions to hold the forgings together. The portions 44 each comprise half of one leg of an X-brace of which the other leg designated by the reference character 78 extends transversely of the other leg. The first mentioned leg has the bond between the portions 44 extending lengthwise, and the other leg 78 has the bond between the portions 44 extending transversely of a mid point.

We claim:

1. A cylinder head for an internal combustion engine comprising, a pair of steel forgings each having a face and a combustion chamber-forming cavity and a port-forming cavity, said forgings being integrally bonded together at said faces, said combustion chamber-forming cavities being so disposed in relation with each other to together form a combustion chamber, said port-forming cavities being so disposed in relation with each other to together form a port open to said combustion chamber, and rings surrounding the forgings at the extremities adjacent the port-forming cavities so as to hold the forgings together.

2. An engine cylinder head having a combustion chamber-forming portion and a gas-conducting port, said port having at one end thereof an opening directed outwardly of the cylinder head and having at the other end thereof an opening directed inwardly of the cylinder head in communication with said combustion chamber-forming portion, said head comprising hemi-head-forming structures integrally bonded together in a plane substantially containing said port and its said openings such that said hemi-structures are respectively formed with approximate hemi-portions of said port and said openings, and rings surrounding the structures at the extremity of the combustion chamber-forming portion and at the outwardly directed end of the gas-conducting port for holding the structures together.

3. An engine cylinder head having a combustion chamber and a port communicating therewith, said head comprising hemi-head-forming structures integrally bonded together in a plane containing said combustion chamber and port such that said hemi-structures are respectively formed with approximate hemi-portions of said combustion chamber and port, and rings surrounding the structures at its extremities adjacent the combustion chamber and the port for holding the structures together.

4. An engine cylinder head having a combustion chamber, a pair of ports communicating with said combustion chamber, and a pair of openings respectively branched from said ports, said head comprising hemi-head-forming structures integrally bonded together in a plane containing said combustion chamber, ports, and openings such that said hemi-structures are respectively formed with approximate hemi-portions of said combustion chamber, ports, and openings, and valve-stem-receiving sleeves positioned in and bonded to the openings formed in the structures.

5. An engine according to claim 4 and further comprising a plate member formed with a pair of inwardly depressed valve-spring-receiving recesses and being bonded to the valve-stem-receiving sleeves at the said recesses.

6. An engine cylinder head according to claim 2 and further comprising a jacket surrounding said cylinder head and having portions thereof spaced from portions of said cylinder head to receive a cooling medium, said jacket comprising hemi-jacket-forming structures bonded integrally together approximately in the aforesaid plane and to the ring surrounding the cylinder-head-forming structures at the outwardly directed end of the gas-conducting port.

7. An engine cylinder head having a combustion chamber and a pair of ports extending outwardly therefrom and comprising mating structures meeting and bonded to one another in a plane containing the chamber and the ports, rings surrounding the structures at the ports for holding the structures together, and a jacketing structure comprising a pair of stamped sheet metal members integrally bonded to one another and to said rings, each of said members having a pair of cavities fitting around terminal hemi-portions of end ports.

8. In an internal combustion engine, a cylinder, a cylinder head structure secured to the outer end of said cylinder, said head structure having a combustion chamber portion and a pair of valve-controlled ports leading outwardly from said chamber, a pair of rings bonded in embracing relation to the head structures at the terminal portions of the ports, a shelf member bonded to the rings in jacketing relation with respect to the head structure and having a pair of valve-spring-receiving cavities formed in a face thereof, valve-stem-receiving guides bonded to the shelf member at the cavities and to the head structure, and a jacket structure comprising hemi-jacket members integrally bonded to each other approximately in a plane of bonding containing the axes of said cylinders and ports and forming side wall portions extending between end portions of said jacket structure, each of said side wall portions being provided with an opening surrounding a terminal portion of one of said ports and bonded to one of the rings, said jacket structure having an opening at one end portion thereof adapted to receive and to be bonded to the shelf member, the other end portion of said jacket structure surrounding said outer end portion of said cylinder in jacketing relation therewith.

9. A cylinder head for an internal combustion engine comprising a pair of complementary sections having cavities therein and being assembled and bonded to one another so as to cause the cavities to mate for forming a combustion chamber and intake and exhaust ports communicating therewith with the complementary sections meeting approximately in a plane passing through the combustion chamber and the intake and exhaust ports, rings tightly embracing the complementary sections about outer terminal portions of the combustion chamber and the intake and exhaust ports for holding the complementary sections together.

10. A cylinder head for an internal combustion engine comprising a pair of complementary sections having cavities therein and being assembled and bonded to one another so as to cause the cavities to mate for forming a combustion chamber and intake and exhaust ports communicating therewith with the complementary sections meeting approximately in a plane passing through the combustion chamber and the intake and exhaust ports, rivets holding the complementary sections together, rings tightly embracing the complementary sections about outer terminal portions of the combustion chamber and the intake and exhaust ports and being bonded to the complementary sections for holding them together.

11. A cylinder head for an internal combustion engine comprising a pair of complementary sections each having combustion chamber cavities and exhaust and intake port cavities extending generally oppositely to one another from the combustion chamber cavities and being assembled and bonded to one another so as to cause the cavities to form a combustion chamber and exhaust and intake ports extending generally oppositely to one another from the combustion chamber with the combustion chamber and the intake and exhaust ports meeting approximately in a plane passing through the combustion chamber and the exhaust ports, rivets joining the complementary sections at portions between the exhaust and intake ports and opposite the combustion chamber, rings tightly embracing the complementary sections about outer terminal portions of the combustion chamber and the intake and exhaust ports and being bonded to the complementary sections for holding them together, jacket-forming shell halves embracing the complementary sections in spaced relation so as to form a coolant jacket about the complementary sections and being bonded to the rings on the terminal portions of the exhaust and intake ports and to one another generally on the plane of bonding of the complementary sections, and a shelf member bonded to the jacket-forming shell halves, the rings on the intake and exhaust ports and the portions of the complementary sections joined by rivets.

12. A cylinder head as specified in claim 11, the shelf member having a pair of depressions formed therein for receiving valve springs, the cylinder head further including sleeves extending inwardly from the depressions into the exhaust and intake ports for receiving exhaust and intake valves.

13. A method of making a cylinder head for an internal combustion engine, comprising providing complementary sections having combustion chamber cavities and intake and exhaust port cavities, assembling the complementary sections so as to cause the cavities to form a combustion chamber and intake and exhaust ports with the sections meeting generally in a plane passing through the combustion chamber and the intake and exhaust ports, riveting the sections to one another at a portion between the intake and exhaust ports and at portions at opposite sides of the combustion chamber for holding the sections together for a subsequent ring-shrinking operation and for a bonding operation subsequent to the ring-shrinking operation, shrinking rings upon the complementary sections at outer terminal portions of the combustion chamber and the intake and exhaust ports to supplement the holding of the sections effected by the aforesaid riveting for a subsequent bonding operation, bonding the complementary sections to one another, removing the riveted portions at the opposite sides of the combustion chamber, applying a water jacket to the exterior of the complementary sections, and bonding the water jacket to the rings at the outer terminal portions of the intake and exhaust ports.

14. A method of making a cylinder head for an internal combustion engine, comprising providing complementary sections having combustion chamber-cavities and intake and exhaust port cavities, assembling the complementary sections so as to cause the cavities to form a combustion chamber and intake and exhaust ports with the sections meeting generally in a plane passing through the combustion chamber and the intake and exhaust ports, applying rings upon the complementary sections at outer terminal portions of the combustion chamber and the intake and exhaust ports to hold the sections together for a subsequent bonding operation, bonding the complementary sections to one another, bonding a shelf member to the forgings, providing jacket members having flanges, bonding the jacket members to the rings and the flanges in overlapping relation to the shelf member, and removing portions of the flanges.

15. A cylinder head for an internal combustion engine comprising, a pair of cylinder head-forming structures each having a face and a port-forming cavity, said structures being integrally bonded together at said faces, said cavities being so disposed in relation to each other to together form a gas-conducting port, each of said cavities extending throughout the length of said port, and a ring surrounding the structures at an extremity of the port-forming cavities so as to hold the structures together, each of said structures having a hemi-cavity branched from the port-receiving cavity, the cylinder head further comprising a valve-stem-receiving sleeve positioned in the hemi-cavities and bonded thereto.

ALEXANDER G. HERRESHOFF.
ADDISON R. HOUK.

REFERENCES CITED

The following references are of record in the file of this patent:

UNITED STATES PATENTS

| Number | Name | Date |
|---|---|---|
| 555,932 | Curtis | Mar. 10, 1896 |
| 822,326 | Tryon | June 5, 1906 |
| 1,267,253 | Murray | May 21, 1918 |
| 1,720,711 | Angle | Nov. 26, 1935 |
| 1,845,901 | Bassler | Feb. 16, 1932 |
| 2,021,942 | Loeffler | Nov. 26, 1935 |
| 2,108,209 | Reilly | Feb. 15, 1938 |
| 2,136,302 | Leighton | Nov. 8, 1938 |
| 2,154,817 | Leighton | Apr. 18, 1939 |
| 2,225,807 | Towler | Dec. 24, 1940 |

FOREIGN PATENTS

| Number | Country | Date |
|---|---|---|
| 126,456 | Great Britain | Nov. 8, 1918 |
| 130,698 | Great Britain | 1919 |
| 584,402 | Germany | 1933 |